(12) United States Patent
Gagnon

(10) Patent No.: US 8,400,002 B2
(45) Date of Patent: Mar. 19, 2013

(54) OCEAN CURRENT ELECTRICAL GENERATING SYSTEM

(76) Inventor: J. Emile M. Gagnon, Vancouver (CA)

( * ) Notice: Subject to any disclaimer, the term of this patent is extended or adjusted under 35 U.S.C. 154(b) by 178 days.

(21) Appl. No.: 12/983,290

(22) Filed: Jan. 1, 2011

(65) Prior Publication Data

US 2012/0167828 A1 Jul. 5, 2012

(51) Int. Cl.
*F03B 13/00* (2006.01)
(52) U.S. Cl. .............................................. 290/43; 290/54
(58) Field of Classification Search ................ 290/43, 290/54
See application file for complete search history.

(56) References Cited

U.S. PATENT DOCUMENTS

| 6,498,402 | B2 * | 12/2002 | Saiz | 290/55 |
| 8,102,069 | B2 * | 1/2012 | Steelman | 290/54 |
| 2010/0276934 | A1 * | 11/2010 | Francis | 290/54 |
| 2010/0283250 | A1 * | 11/2010 | Capone et al. | 290/54 |

FOREIGN PATENT DOCUMENTS

WO  WO 2007/031800 A1 *  3/2007

\* cited by examiner

*Primary Examiner* — Tho D Ta

(57) ABSTRACT

A series of underwater sails spaced apart, attach to a moving cable loop between pulleys with electric generators. The sails inflate by the force of the water current and drive the cable in the direction of the current to turn the generators to generate electricity. As the sails reach the end pulley or tail spool they deflate and are pulled back to the beginning power pulley in a continual repeated cycle.

10 Claims, 5 Drawing Sheets

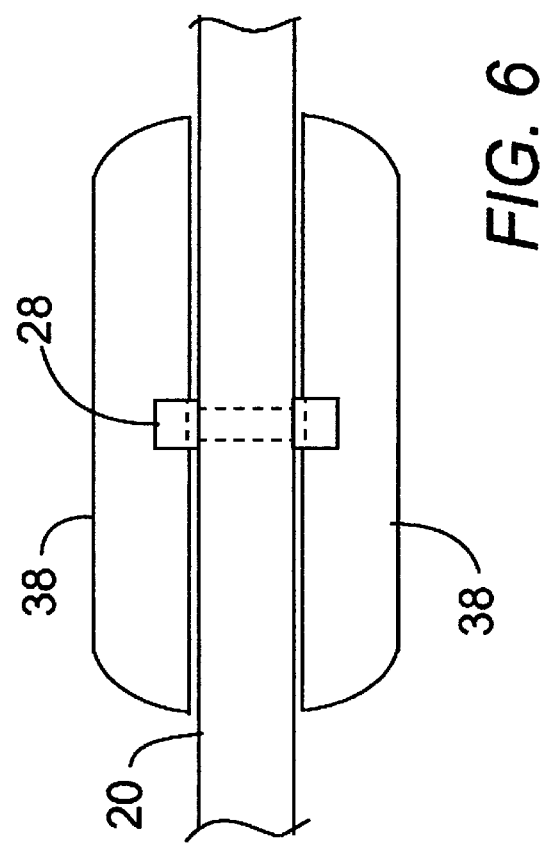

OCEAN CURRENT ELECTRICAL GENERATING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to generating electrical energy from fluid currents and particularly to an ocean current generating system comprising a plurality of parachutes or scoop-like sails connected to a continuous cable on a pulley system for converting ocean current energy to electrical energy.

2. Description of Related Art Including Information Disclosed Under 37 CFR 1.97 and 1.98

Prior art devices fail to produce continuous electricity using very long lasting generating equipment run by ocean currents.

U.S. patent application #20080303284, published Dec. 11, 2008 by Clemens, discloses a low-profile apparatus for converting water current into electricity.

Fabric scoops are spaced along a continuous belt and, when submerged in a current of moving water, are pushed by the current thereby causing the continuous belt to move. The current pushes the fabric scoops downstream and then fold closed as the fabric scoops are rotated out of the water and travel back upstream. The moving continuous belt is used to turn an electric generator, which causes the apparatus to produce electrical energy. The apparatus includes one or more floats to support the continuous belt, electric generator, and other components of the apparatus. The apparatus can be moored or anchored in a variety of locations where there is moving water or currents. The apparatus maintains a low profile by using fabric scoops that collapse and fold flat when not submerged thereby reducing wind resistance and visible surface area above the waterline.

U.S. patent application #20080303285, published Dec. 11, 2008 by Bondhus, indicates a hydroelectric generation device utilizing a series of parachutes below the surface of a flowing body of water for imparting rotational energy to a generator assembly. The hydroelectric generation device can include a positioning assembly for positioning and retaining the hydroelectric generation device below a water surface. The generator assembly generally includes a generator positioned on a water bed for producing electricity from a rotation input to the generator and a transmission line for transmitting the electricity for use on shore. The parachutes are attached to a cable loop which interfaces with an axle assembly for transferring rotational energy to the generator assembly.

U.S. patent application #20030066934, published Apr. 10, 2003 by Bolonkin, puts forth the method of utilization of a flow energy and power installation for it. FIGS. 18A, 18B and 19 show a rope rotor with blade-parachutes which comprises a closed loop rope, a rotor, a main roller (pulley), an energy transferor and a plurality of parachutes to catch the flow energy, such as wind or water.

U.S. patent application #20090127861, published May 21, 2009 by Sankrithi, describes a fluid-dynamic renewable energy harvesting system which includes fluid-foil means for interfacing with a fluid current such as a water current or wind or both, and which includes energy harvesting means utilizing fluid current driven periodic motion of the fluid-foil means for capturing fluid-dynamic renewable energy and converting it into usable energy in a desired form such as electricity. FIGS. 9A and 9B illustrate the use of fluid foils on a cable which is connected to rotatable pulleys.

U.S. Pat. No. 3,887,817, issued Jun. 3, 1975 to Steelman, provides a power generating device comprises a continuous elongated flexible loop member having opposite loop ends and adapted to be suspended in a current of flowing fluid. The loop member is trained around a rotatable member, which in turn is drivingly connected to an electrical generating power means. A plurality of flexible and collapsible containers or sails is mounted in spaced relationship and in end to end relationship along the loop member. When immersed in a current of moving fluid, the containers will be expanded and filled by the fluid when their open ends are facing upstream in relation to the current and they will be collapsed and emptied of fluid when their open ends are facing downstream in relation to the current. Thus the containers will drive the loop member and consequently the rotatable member continuously whenever the loop member and containers are immersed in a flowing fluid material.

U.S. Pat. No. 6,555,931, issued Apr. 29, 2003 to Mizzi, claims renewable energy systems for extracting energy from natural water flow or wind. The energy systems are configurations of long-stroke open-channel reciprocating engines employing one or two flow engaging elements such as drogue chutes for water flow or airfoils for wind applications tethered to a power drum and useful to generate electricity or to pump water as from wells.

U.S. Pat. No. 6,809,430, issued Oct. 26, 2004 to Diederich, discloses a conveyor-type apparatus harnesses energy from a fluid flow, for example a river or a tidal flow region, and comprises a support structure, a continuous-loop, flexible driven element, for example a pair of chains, mounted to the support structure and extending along a closed-loop path, the path defining an interior region and an exterior region, and a series of reversible fluid foils. The driven element has first and second reaches, the first and second reaches being upflow and downflow reaches when fluid flows from the first reach to the second reach. Each fluid foil is connected to the flexible driven element for movement between a first orientation, situated in the interior region when moving along the upflow reach, and a second orientation, situated in the exterior region when moving along the downflow reach. The first sides are generally concave when moving along the upflow reach and generally convex when moving along the downflow reach. The second sides are generally concave when moving along the downflow reach and generally convex when moving along the upflow reach. The driven element may be coupled to an energy generator so to harness energy from the fluid flow. The series of sail-like reversible fluid foils could be constructed from a variety of materials, including metal, polymers, composites, fabrics, etc.

U.S. Pat. No. 1,757,894, issued May 6, 1930 to Zvirblis, provides a continuously moving loop encircling a generator with a series of buckets attached to the loop for utilizing the movement of a water current, as in a sluice, to move the buckets and the loop to turn the generator to generate electricity.

U.S. Pat. No. 6,498,402, issued Dec. 24, 2002 to Saiz, shows a wind energy catchment device that consists of loops of closed circuits of cables or ropes which go through a succession of parachutes in series, that rotates by means of pulleys among columns, pylons or shafts secured to rigid supports fixed to the ground, the cables go through the parachutes by their asymmetry axis, the cables are secured to the fabric of the parachute by their center zone, having the parachute a hole or holes around said cable, the ends of the strings of the parachute tie or join its periphery with a common point of the cable.

What is needed is a ocean current generator that is driven by a constant current in the ocean, without the use of fuel, and that will stay in operation automatically as long as the current flows, requiring little or no care and expense, except for the initial outlay in manufacturing and setting up the apparatus.

BRIEF SUMMARY OF THE INVENTION

An object of the present invention is to provide an ocean current generating system which generates electrical current continually by using a long cable loop with a series of attached flexible parachute-type sails immersed below the surface of the ocean in a constant ocean current or other body of water with a strong current such as a river, which system will stay in operation automatically as long as the current flows, requiring little or no care and expense, except for the initial outlay in manufacturing and setting up the system.

In brief, the ocean current generating system of the present invention operates using the applied principle of the 'sea-anchor.' The ocean current generating system will generate electricity from ocean currents using a simple system of underwater sails spaced well apart, attached to a huge long cable loop extending for many kilometers down-current from the generator. The sails inflate in the ocean current and drive the cable in the direction of the ocean current to turn the generator to generate electricity. As the sails reach the end pulley or tail spool they deflate and are pulled back to the beginning power pulley in a continual repeated cycle.

The various components of the present invention will preferably be manufactured in space/micro-gravity and splash down right at the assembly site in the South Atlantic Ocean. Each site will be designed to generate up to 10 gigawatts directly from the ocean current, and send it to customers (utility companies) via undersea superconductor transmission lines.

Water being 600 times as dense as air, means that a 15 knot ocean current contains many times more energy than wind of the same speed. A wind averaging 15 knots will generate enough electricity to justify the expense of installing a wind generator.

Ocean currents can supply all of the world's electricity demand. The Antarctic Ocean current is 1,000s of kilometers long and 100s of kilometers wide and travels faster than 15 knots continually, and contains many thousands of terawatts of energy.

There are many nuclear reactors and thermal generating plants that will become obsolete or contaminated or worn out and will be in need of replacement. Hydro-electric dams will eventually silt up and lose generating capacity, also the water being dumped through the turbines could be more gainfully applied as irrigation water. The present invention will be the ideal "green" replacement for obsolete and worn-out systems.

The present invention will ensure a reliable in-use service life measured in millennia to provide power for global energy needs as a great service and value to humanity.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings:

FIG. 6 displays the attachment of neutral buoyancy tanks 38 to endless loop cable 20 by means of attachment element 28. Attachment element 28 is designed to extend through the side of loop cable 20 and will be attached to center of buoyancy tanks 38 allowing the tank to make the turns at each end of loop cable 20 without binding or interfering with the operation of pressure roller 32 (FIG. 5).

DETAILED DESCRIPTION OF THE INVENTION

Figure 1:
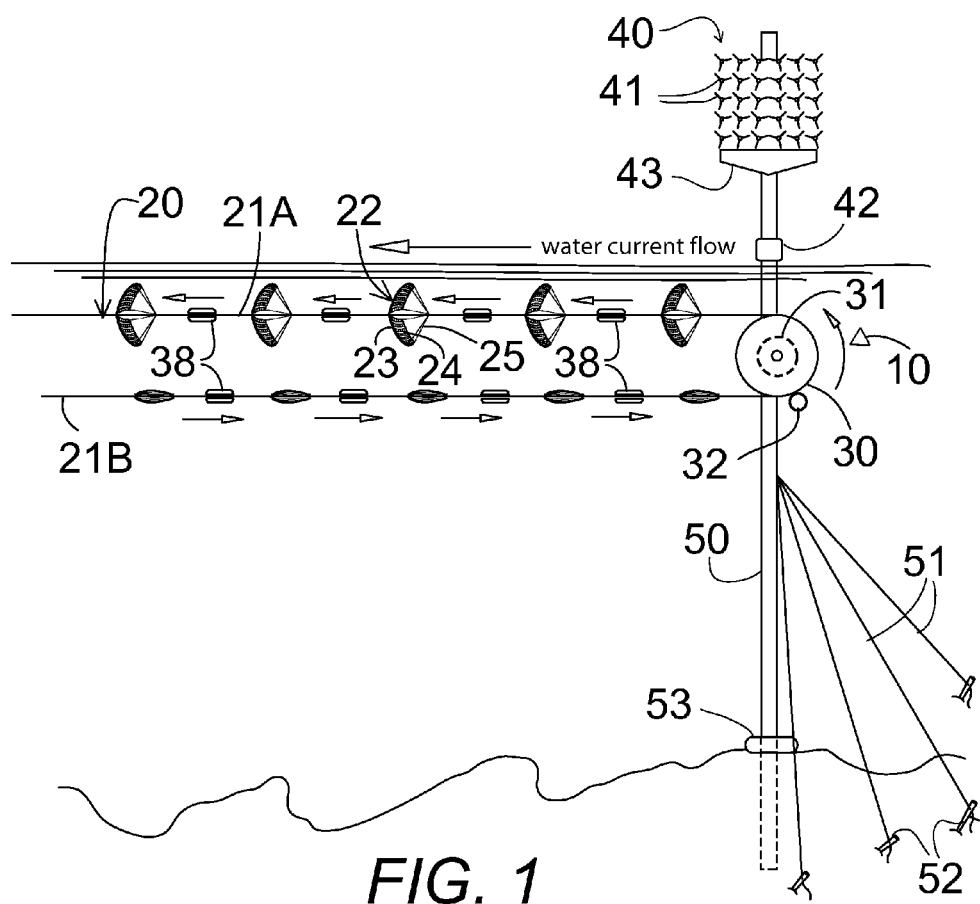
FIG. 1 is a partial side elevational view of a deep water embodiment of the electrical energy generating underwater sail and cable pulley system of the present invention showing one of the two pulleys with its generator in the pulley and showing its support structure, which extends up out of the water to support wind powered generators and a fish hatchery, and a small portion of the cable loop and attached underwater sails, which are actually shown in plan view to illustrate the open sails which are open in the direction of water current flow to move the cable and showing the sails contracted in the opposite direction to limit resistance.

In FIGS. 1-5, an electrical energy generating underwater sail and cable pulley system 10 comprises a main moving loop cable 20 with a series of attached underwater sails 22 and a pair of pulleys 30 with generators 31 turned by the moving loop cable 20 with the sails 22 driven by the water current.

Figure 2:
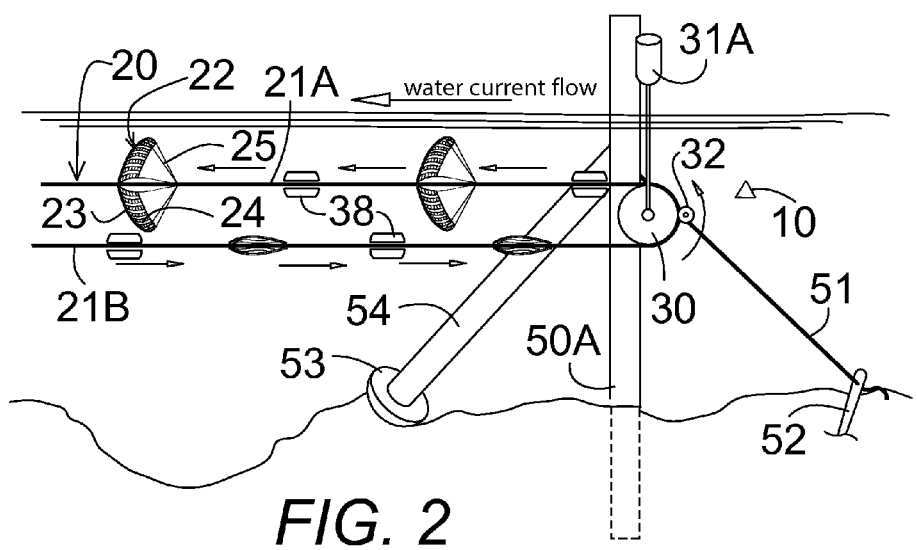
FIG. 2 is a partial side elevational view of a shallow water embodiment of the electrical energy generating underwater sail and cable pulley system of the present invention showing one of the two pulleys with its above water generator and showing its support structure and a small portion of the cable loop and attached underwater sails, which are actually shown in plan view to illustrate the open sails which are open in the direction of water current flow to move the cable and showing the sails contracted in the opposite direction to limit resistance.
Figures 3, 4:
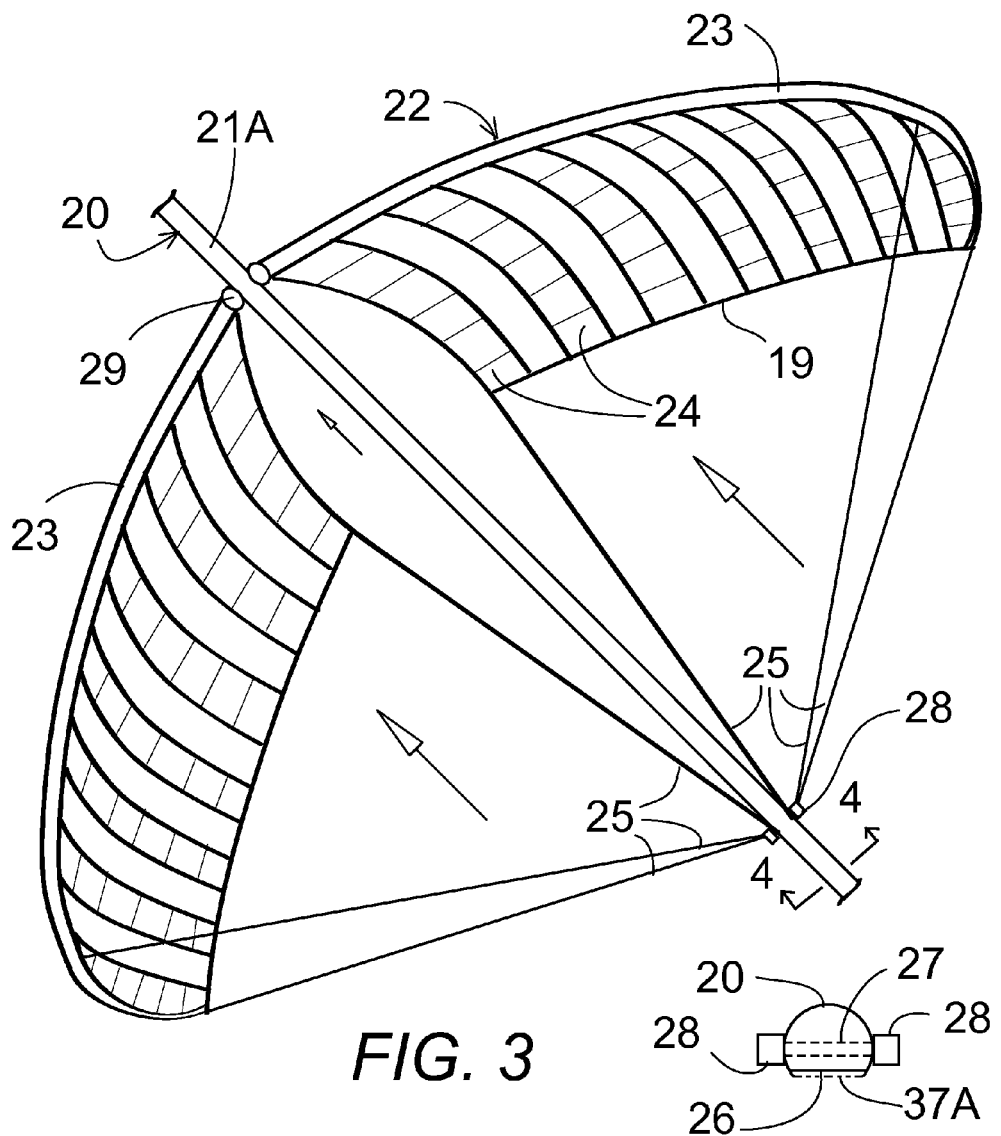
FIG. 3 is top plan view of one of the paired sails of the electrical energy generating underwater sail and cable pulley system of the present invention showing the pair of articulated steel booms each attached by a boom hinge to the to the moving loop cable one on each side of the moving loop cable out of contact with the pulleys, a boom cable stay attached between an outer end of each of the booms and a boom cable stay attaching element on the moving loop cable spaced away from the boom hinges, an array of elongated sheets of flexible sail material attached to each of the booms along one edge of the sail material, a sail edge cable stay attached along an opposite edge of the sail material and a sail end cable stay attached from each outer end of the sail edge cable stay to sail end cable stay attaching elements adjacent to the boom cable stay attaching elements.
FIG. 4 is a cross-sectional view of the main loop cable taken through 4-4 of FIG. 3 showing the flat bottom contacting surface of the main loop cable to engage the pulleys and showing the through cable connection of the stay cable ends to the main loop cable.

In FIGS. 1-4, the electrical energy generator comprises a moving loop cable 20 encircling a pair of spaced pulleys 30 positioned underwater in a water current flow in a body of water. A series of spaced underwater sails 22 are attached in a spaced array to the moving loop cable 20. A series of evenly-spaced steel neutral buoyancy chambers 38 are attached to the moving loop cable 20 between the underwater sails 22, each attached by means of a boom cable stay attaching element 28. Each of the sails 22 comprises a pair of articulated steel booms 23 each attached by a boom hinge 29 to the to the moving loop cable 20 one on each side of the moving loop cable out of contact with the pulleys 30. A boom cable stay 25 is attached between an outer end of each of the booms and a boom cable stay attaching element 28 on the moving loop cable spaced away from the boom hinges. In FIG. 3, a spaced series of sheets of flexible sail material 24 are attached to each of the booms 23 along one edge of the sail material and to a sail edge cable stay 19 attached along an opposite edge of the sail material. A sail end cable stay 25 is attached from each outer end of the sail edge cable stay 19 to the sail end cable stay attaching elements 28 adjacent to the boom cable stay attaching elements, so that the sails billow out by the force of the water current flow on a first side of the moving cable loop to move the first side of the moving cable loop 21A in the direction of the water current flow to turn the pulleys 30. The booms and sails configured to collapse down on a second side of the moving cable loop 21B moving against the current flow to reduce drag on the system and return each of the collapsed underwater sails back to the first side of the moving cable loop to billow out with the moving water current in a continual repeated cycle.

Figure 5:
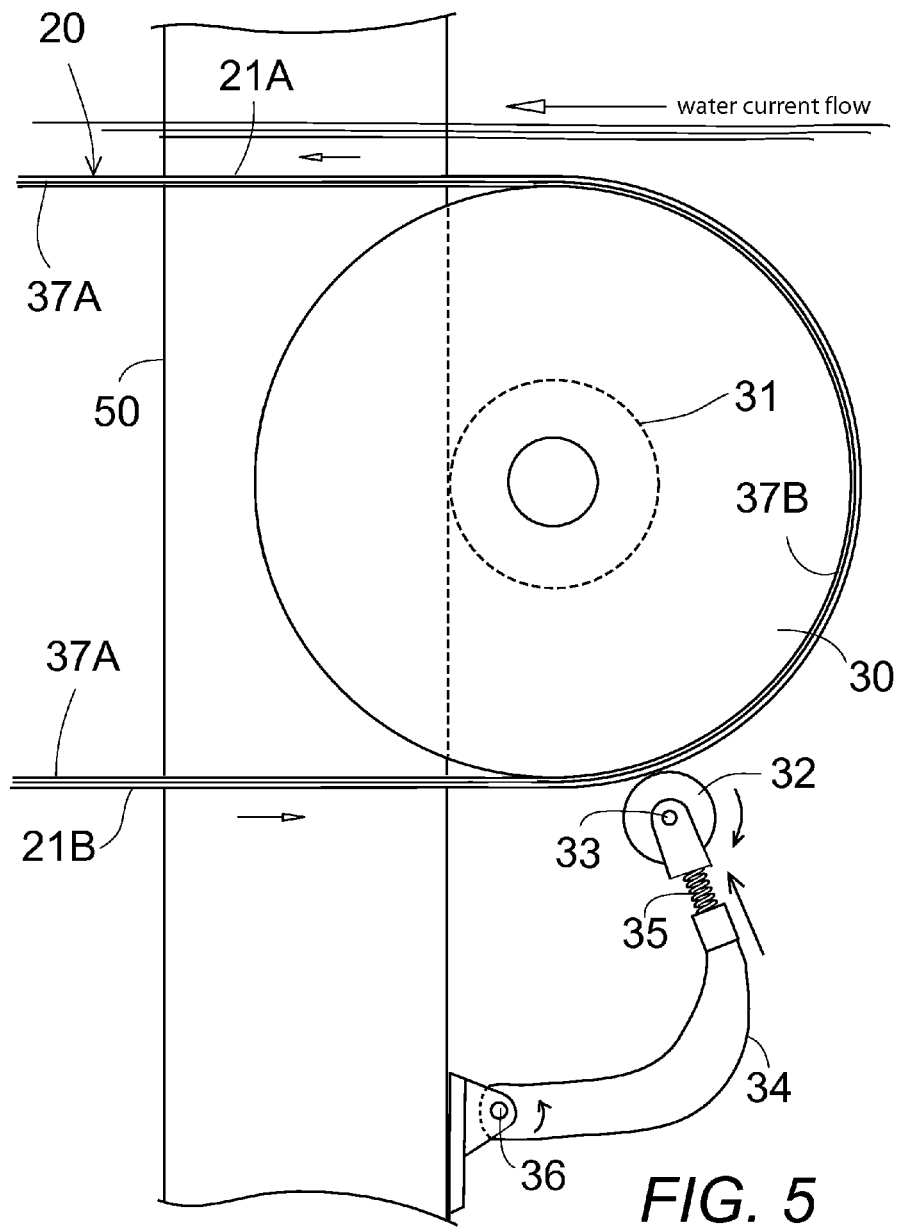
FIG. 5 is an enlarged elevational view of one of the pulleys of the electrical energy generating underwater sail and cable pulley system of the present invention showing one of the two pulleys with its generator in the pulley and showing its support structure and a small portion of the cable loop not showing the attached underwater sails, and showing the phase changing lubricant on a flat bottom contacting surface between the moving loop cable and each pulley so that the pressure of the pressure roller bearing causes a phase change in the phase changing lubricant from a liquid phase to a solid phase binding the moving loop cable to the pulley.

In FIGS. 1, 2, and 5, at least one electrical generator 31 and 31A is connected to each of the pulleys 30 so that turning the pulleys 30 turns the generator 31 and 31A to generate an electrical current. The generator 31 may be built into the pulley 30, as shown in FIGS. 1 and 5 or the generator 31A may be positioned out of the water and connected to the pulley 30 by a gear arrangement, as shown in FIG. 2.

In FIGS. 1, 2, and 6, a series of evenly spaced neutral buoyancy chambers 38 is attached to the moving loop cable 20 by means of a series of a boom cable stay attaching elements 28, providing neutral buoyancy at the depth of the return line of the moving loop cable 20, and preventing the return line of the moving loop cable from sagging down, pulling the end pulley or tail spool forward, and interrupting the generator's production of electricity, and in the event of an accident that pulls the cable off the pulley, preventing the entire moving loop cable from sinking below the depth of the return line and being lost in the ocean.

In FIG. 5, a pressure roller 32 having a center pivot 33 attached by a pivot arm 34 to an external pivot 36 on the support structure 50 may be pressed against the cable 20 on the pulley 30 by a spring 35 or hydraulic device as a bearing force means for maintaining the moving loop cable 20 against each pulley 30 to reduce slippage therebetween and to maximize power transfer between the moving loop cable 20 and the pulleys 30 preferably applying the bearing force against the moving cable loop 20 perpendicular to each pulley 30 adjacent at an initial point of contact therebetween. The means for maintaining the moving loop cable 20 against each pulley 30 may further comprise a phase changing lubricant 37A on a contacting surface 26, in FIG. 4, between the moving loop cable 20 and each pulley 30 so that the pressure of the pressure roller 32 causes a phase change in the phase changing lubricant 37A from a liquid phase of the phase changing lubricant 37A on the free cable to a solid phase of the phase changing lubricant 37B against the pulley 30 binding the moving loop cable 20 to the pulley 30 for maximum friction to prevent slippage therebetween.

An upright structure 50 and 50A is anchored on a bottom of the body of water as a means for anchoring each pulley to a bottom of the body of water. In FIG. 1, for a deep water electrical energy generating underwater sail and cable pulley system, a tall upright structure 50 extends up above the body of water and further comprising at least one wind turbine generator 40 with an array of wind turbines 41 may be mounted on the upright structure 50 and may include a fresh water condensation system 43. A fish hatchery and harvester 42 may also be mounted on the upright structure 50. In FIG. 1, a concrete foundation 53 and support cables 51 with bottom anchor posts 52 may be used to anchor the vertical support in addition to burying the bottom of the vertical support. In FIG. 2, for a shallow water electrical energy generating underwater sail and cable pulley system, a buried heavy steel vertical post 50A may be used with a steel thrust beam 54 at an angle to the vertical post 50A against a concrete foundation 53 in the direction of the cable loop 20 combine with cables 51 and bottom anchor posts 52 combine to support and stabilize the vertical support 50A.

All parts must be extremely strong and corrosion resistant to function properly and resist corrosion in a salt water environment.

In use, the electrical energy generating underwater sail and cable pulley system 10 would be installed in a location with constant powerful water currents for a continual output of electricity.

It is understood that the preceding description is given merely by way of illustration and not in limitation of the invention and that various modifications may be made thereto without departing from the spirit of the invention as claimed.

What is claimed is:

1. An electrical energy generating underwater sail and cable pulley system comprises:

an electrical energy generator comprising a moving loop cable encircling a pair of spaced pulleys positioned underwater in a water current flow in a body of water; a series of spaced underwater sails attached to the moving loop cable, each of the sails comprising a pair of articulated steel booms each attached by a boom hinge to the moving loop cable one on each side of the moving loop cable out of contact with the pulleys, a boom cable stay attached between an outer end of each of the booms and a boom cable stay attaching element on the moving loop cable spaced away from the boom hinges, at least one sheet of flexible sail material attached to each of the booms along one edge of the sail material, a sail edge cable stay attached along an opposite edge of the sail material and a sail end cable stay attached from each outer end of the sail edge cable stay to sail end cable stay attaching elements adjacent to the boom cable stay attaching elements, so that the sails billow out by the force of the water current flow on a first side of the moving cable loop to move the first side of the moving cable loop in the direction of the water current flow to turn the pulleys, the booms and sails configured to collapse down on a second side of the moving cable loop moving against the current flow to reduce drag on the system and return each of the collapsed underwater sails back to the first side of the moving cable loop to billow out with the moving water current in a continual repeated cycle:

at least one electrical generator connected to at least one of the pulleys so that turning the at least one of the pulleys turns the generator to generate an electrical current;

means for maintaining the moving loop cable against each pulley to reduce slippage therebetween and to maximize power transfer between the moving loop cable and the pulley; and means for anchoring each pulley to a bottom of the body of water.

2. The system of claim 1 wherein each of the sails comprises a series of spaced elongated strips of flexible sail material.

3. The system of claim 1 wherein a series of neutral buoyancy chambers is evenly spaced between the underwater sails and attached to the moving loop cable by a series of boom cable stay attaching elements, to provide neutral buoyancy at the depth of the return line of the moving loop cable, to prevent the cable from sagging down, and in the event of an accident that pulls the cable off the pulley, to prevent the cable from sinking below the level of the return line and being lost in the ocean.

4. The system of claim 1 wherein the means for maintaining the moving loop cable against each pulley comprises a pressure roller applying a bearing force against the moving cable loop perpendicular to each pulley adjacent to an initial point of contact therebetween.

5. The system of claim 4 wherein the pressure roller bearing force is applied by a spring.

6. The system of claim 4 wherein the pressure roller bearing force is applied by a hydraulic device.

7. The system of claim 4 wherein the means for maintaining the moving loop cable against each pulley further comprises a phase changing lubricant on a contacting surface between the moving loop cable and each pulley so that the pressure of the pressure roller causes a phase change in the phase changing lubricant from a liquid phase to a solid phase binding the moving loop cable to the pulley.

8. The system of claim 1 wherein the means for anchoring each pulley to a bottom of the body of water comprises an upright structure anchored on a bottom of the body of water.

9. The system of claim 8 wherein the upright structure extends up above the body of water and further comprising at least one wind turbine generator mounted on the upright structure.

10. The system of claim 9 further comprising a fish hatchery and harvester mounted on the upright structure.

* * * * *